Sept. 18, 1923.
L. K. SNELL ET AL
1,468,522
SUPPORT FOR CONTROLLED MECHANISM
Filed Jan. 6, 1919    3 Sheets-Sheet 2
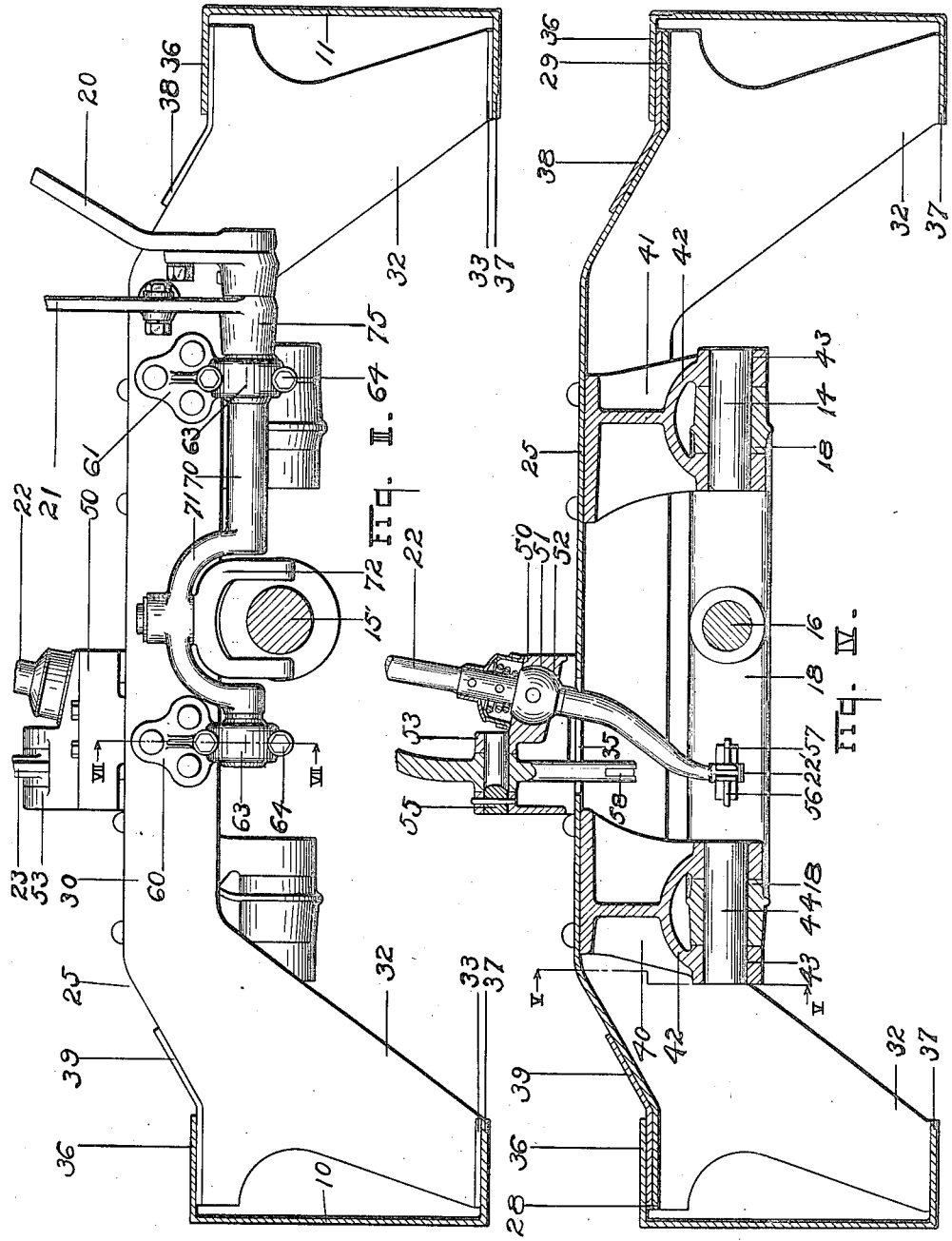
Inventors.
Lyle K. Snell
Charles W. McKinley
By Chester W. Buselton
Attorney Sept. 18, 1923.   L. K. SNELL ET AL   1,468,522
SUPPORT FOR CONTROLLED MECHANISM
Filed Jan. 6, 1919   3 Sheets-Sheet 3
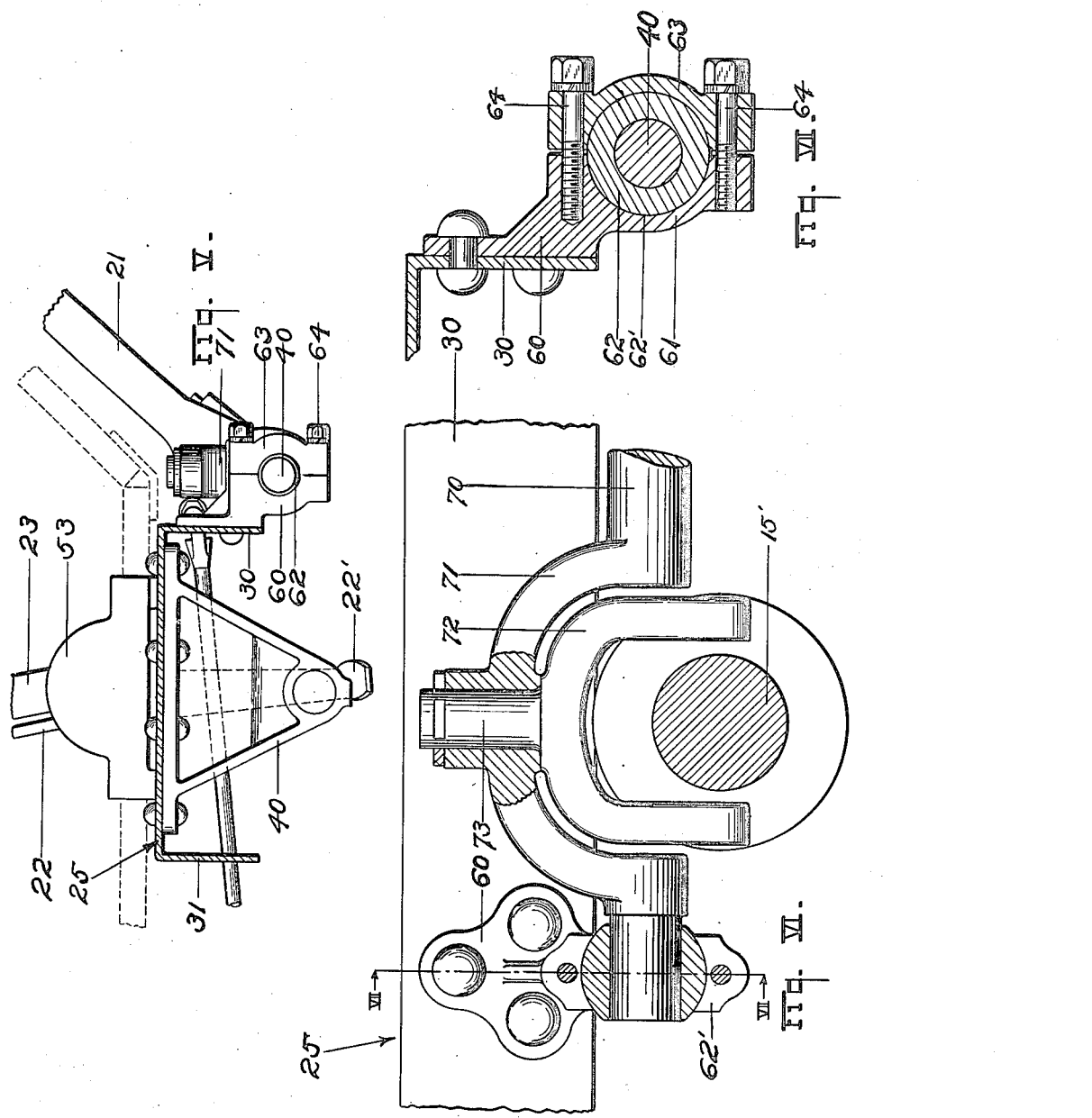
Inventors.
Lyle K. Snell
Charles W. McKinley
By Chester H. Brosseton
Attorney Patented Sept. 18, 1923.

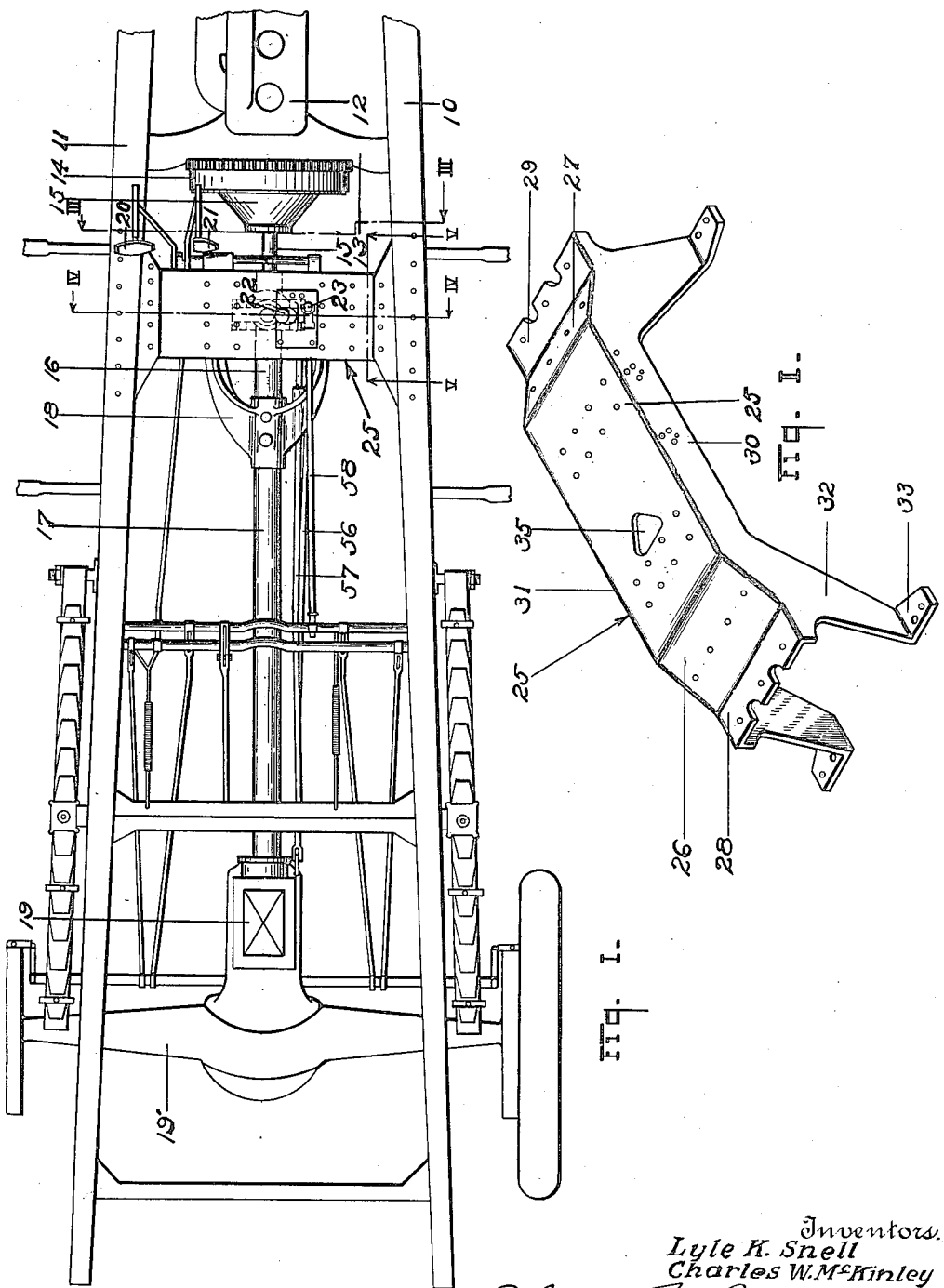

1,468,522

UNITED STATES PATENT OFFICE.

LYLE K. SNELL AND CHARLES W. McKINLEY, OF TOLEDO, OHIO, ASSIGNORS TO THE WILLYS-OVERLAND COMPANY, OF TOLEDO, OHIO, A CORPORATION OF OHIO.

SUPPORT FOR CONTROLLED MECHANISM.

Application filed January 6, 1919. Serial No. 269,829.

*To all whom it may concern:*

Be it known that we, LYLE K. SNELL and CHARLES W. McKINLEY, citizens of the United States, residing at Toledo, county of Lucas, and State of Ohio, have invented certain new and useful Improvements in Supports for Controlled Mechanism, of which we declare the following to be a full, clear, and exact description.

The present invention relates to a novel type and arrangement of supporting base for carrying and operatively supporting the several operator's controlling mechanisms in a motor vehicle, including for example the clutch pedal and operating parts, the interior brake controlling pedal, the gear shifting lever and its base, the exterior brake controlling lever and the universal yoke for supporting the torque tube of the transmission shaft, the invention having for one of its objects to provide a simple, preferably pressed metal, supporting base for this purpose, adapted to also act as a brace for the chassis frame of a motor vehicle, and so designed as to materially lighten the construction and reduce the weight of the assembly as a whole, at the same time providing a particularly rigid and efficient device for the purpose intended.

Further objects of the invention are to provide a unitary light sheet metal pressed plate of the character indicated, so designed as to materially facilitate the assembly in the chassis of a motor vehicle, the operator's controlling mechanism and the universal yoke referred to and to eliminate and avoid the necessity for certain separate arms or brackets and pivots heretofore used in some known types of supporting bases.

Furthermore, our invention contemplates a novel type of supporting base, per se, so arranged to form a particularly strong, rigid construction; and to provide a particularly rigid means for securely attaching the same to the side frame of the motor vehicle chassis as will hereinafter more fully appear.

Further objects of this invention relate to certain economies of manufacture as suggested and as will appear in the certain details of construction as shown from the description to follow. We accomplish the objects of our invention in one instance by the devices and means described in the following specification, but it is evident that the same may be widely varied without departing from the scope of the invention, as pointed out in the appended claims. A structure constituting one embodiment of the invention, which may be the preferred, is illustrated in the accompanying drawing forming a part herein, in which:

Fig. I is a top plan view of an assembled chassis showing my improved type of base for supporting certain controlling mechanisms, applied thereto.

Fig. II is a perspective view of improved type of supporting base detached from the chassis.

Fig. III is a sectional view taken on the line III—III of Fig. I.

Fig. IV is a sectional view taken on the line IV—IV of Fig. I.

Fig. V is a transverse-sectional view taken on the line V—V of Fig. I.

Fig. VI is a sectional view taken of the transmission shaft and showing the clutch shifting mechanism pivoted to our improved type of supporting base.

Fig. VII is a sectional view taken on the line VII—VII of Fig. VI.

One embodiment of the invention is illustrated herein and is shown applied to one type of motor vehicle chassis, having a frame with channel shaped side members 10, 11, the flanges of the channels facing inwardly as will be seen from Figs. III and IV. The engine 12 is shown supported by a base or engine support 13 on the chassis of the vehicle. A fly wheel 14 and a usual type of clutch 15 is shown connected with a shaft 15', which, as will be understood, is coupled through a universal joint to propeller shaft 16 passing through the torque tube 17. A yoke 18 pivotally supports the tube 17 in the manner well known in the art, and the shaft 16 extends to the gear shifting mechanism located within a casing 19 adjacent the rear axle 19' of the vehicle, the construction described being a type of well known vehicle chassis construction. A certain controlling mechanism whereby an operator may properly manipulate the motor vehicle are illustrated herein as including a clutch pedal 20, an internal brake controlling pedal 21, a gear shifting lever 22 and an external brake band controlling lever 23, as herein stated, the present invention is concerned with a novel type of supporting base for the several levers and pedals, their pivoting brackets or bases and hangers for the forward end of the torque tube 17, my improved type of supporting base being designed so as to accommodate the universal joint referred to and pivoted yoke 18 of the torque 17.

One form of novel pressed metal supporting base and rigid bracing means for a chassis construction of the character referred to above is illustrated detached from the chassis in Fig. II, where it will be seen that the same may be pressed up to form an arched central portion 25 of rectangular configuration terminating at either end with downwardly inclined portions 26 and 27 to form the ends of the completed arch. The terminals of the downwardly inclined portions are laterally extended as indicated at 28 and 29 for the purpose as will hereinafter appear of securing the base to the chassis frame of the vehicle. The body portion of the supporting base is provided with downwardly extending forward and rear flanges 30 and 31, located on either side of the body portions of the base, these flanges 30 and 31 at each end of the unit being enlarged and downwardly extended, as illustrated in the drawing, to form a plurality of supporting legs 32, one located at each corner of the supporting unit. Each of the legs 32 are preferably provided with laterally offset feet 33, which are adapted to support the unit on the lower flanges of the channel members of the side frame of the chassis. The supporting unit is provided with a plurality of openings and holes arranged as necessary to form openings through which rivets or bolts or parts of the mechanisms may be inserted to secure to the unit various brackets, hangers and supporting elements for the vehicle control mechanisms and the other parts carried by the base and accommodate the parts thereon.

When assembled to the chassis frame of a motor vehicle, my improved type of unitary supporting base is so positioned therein and so constructed that the terminal flanges 28 and 29 bear on the underside of the upper inturned flanges 36 on the channel bars of the frame members of the chassis, while the feet 33 on the several legs 32 of the unit rest upon the upper surface of the lower flanges 37. The feet 33 and extensions 28 and 29 may be riveted or secured to the flanges in any well known manner. I have also shown herein a plurality of gusset plates 38 and 39, one located on either side of the supporting base unit between the inclined extensions 26 and 27 and the terminals 28 and 29, to brace the same at the points of connection of the base unit with the side frames of the motor vehicle chassis. It is apparent, however, that the gusset plates referred to may be omitted, as deemed expedient.

The arched configuration given to the unit permits the same, when assembled as suggested, to bridge the universal joint in the propeller shaft of the vehicle, and also forms a means on which may be located the pivots or pivoting or supporting hangers for the torque tube supporting yoke 18. To this end, the underside of the base plate 25 is provided with a plurality of depending brackets 40 and 41 shown in Fig. IV, each of the brackets being provided with a terminal fork 42 at their lower ends, the forks having bearing openings 43 therein for receiving a pin or supporting pivot 44. The yoke member 18 on the torque tube 17 is pivoted therein. It will thus be seen that my improved type of unitary supporting base unit operatively supports the tube 17 and forms a partial covering for the same.

The upperside of the unit 25 forms means to support a base 50, carrying gear shifting lever 22 and the external brake band operating lever 23. This supporting base 50, as shown in Fig. IV, has a socket 51 to receive the ball joint 52 on the lever 22 to pivot the gear shifting lever 22 in said socket, while the base 50 is also provided with a boss 53 in which a pin 55 pivotally supports the external brake band controlling lever 23, as will be readily understood to those skilled in the art. The lower ends of these levers pass through an opening 35 in the unitary base support 25 and terminate underneath the arch of the unit, in the position to be connected with the proper rods for controlling the associated mechanisms, the gear shifting lever terminating in a contact nut 22', adapted to be shifted to engage either one of a plurality of sliding gear transmission controlling rods 56 or 57. The other lever 23 for controlling the external brake is connected to the brake rod 58. In the particular type illustrated herein, the levers 56 and 57 of the gear shifting mechanism pass through an opening in the yoke 18; this being apparent from Figs. I and IV. The lever 58 for the external brake band passes through the flange 31 on the unitary supporting base 25, the lever extending upwardly to the proper mechanism for controlling this element of the motor vehicle.

The clutch operating pedal and the service or internal controlling pedal are mounted on a rock shaft, which is pivoted in bearings depending from the forward flange 30 of the unitary supporting base 25. As shown in Figs. III and VII a plurality of brackets 60 and 61 are riveted or otherwise secured to the depending flange 30 and preferably these brackets are made and arranged to carry self adjusting bearing members 63 of spherical exterior configuration for supporting the pedal rock-shaft 70. The brackets 60 and 61 each have a half spherical socket 62' and cap 63 constituting the other half of the socket for the self adjusting bearing 62, and is suitably secured to the brackets, as by the bolts 64, clearly shown in Fig.

VII. By use of the self adjusting bearings which directly support the rock shaft 70, the assembly of the rod 70 which carries the clutch operating fork may be made without accurate alignment in the bearings and after the assembly, the parts will automatically assume proper position and be self adjusting in use. It is to be understood that any type of clutch operating mechanism may be employed herewith, and the particular type shown consists in the rock shaft 70, provided with an upwardly turned yoke portion 71 for receiving the clutch operating fingers or fork 72 swiveled therein by a spindle 73 adapted to operate the clutch in a manner well understood in the art. As shown in Fig. III, the shaft 70 extends beyond the bearing 61 and adjacent the end of the shaft is fixedly secured thereto the clutch operating pedal 20. The shaft 70 forms a convenient means upon which to loosely mount the internal brake operating pedal 21, and to this end, the lower end of the pedal is provided with an enlarged pivoting hub 75, the same being properly positioned on the shaft 70 on one side by the bearing 61 and on the other side by the clutch pedal 20.

From the description, the manner in which the several vehicle controlling mechanism and chassis parts are supported therefrom will, it is believed, be clearly understood. The unitary preferably pressed metal, supporting base formed, may be readily constructed to make a light, rigid base for the purposes intended, and the same will act when in place as a rigid brace for the chassis frame. As hereinbefore stated, the base has integral means for attaching the same to the side frame of the chassis in an efficient manner by the depending legs 32, feet 33 together with the ledges 28 and 29, fitting against the flanges of the channels constituting the side frame members of the vehicle chassis frame. It will be apparent that the type of supporting base disclosed herein is so constructed as to accommodate the parts referred to and to greatly facilitate the assembly of the various controlling pedals, levers, and their operating mechanisms, thereby reducing the time of assembly of the motor vehicle chassis, as a whole. Attention is called to the fact that in addition to the advantages heretofore mentioned by arching the unitary supporting plate or base 25, a substantial increase in strength is given the unit, at the same time a space is provided within which to locate the universal joint in propeller shaft of the vehicle or between the propeller shaft and transmission shaft. Moreover, means are provided from which the supporting yoke 17 may be readily pivoted from my improved type of unitary supporting base and bracing member 25, while the depending front flanges 30 and 31 of the unit form means which may be utilized to attach thereto various parts of a chassis assembly such as the mechanisms controlled by the pedals including the clutch pedal and internal brake pedal. It is evident that a unitary structure of this character results in a material saving in material and weight over the use of heavy cast metal braces with various extensions and pivotal supports for the various operative parts herein referred to and over other known types of support.

While we have described our invention in more or less detail and as being embodied in certain precise forms, we do not desire or intend to be limited thereto, as on the contrary our invention contemplates broadly all proper changes, as well as the omission of immaterial elements and the substitution of equivalents therefor, as circumstances may suggest or necessity render expedient.

Having thus described our invention, what we desire to secure by Letters Patent of the United States and claim is:

1. A unitary supporting base for the controlling lever mechanisms of a motor vehicle assembly having channel side frames, comprising an arched pressed metal support and brace, provided with integral depending legs adapted to support and secure said supporting base to the channel shaped side frame members of the vehicle chassis, said supporting base carrying means to support the controlling lever mechanisms, in a manner set forth.

2. In a unitary support for a plurality of controlling lever mechanisms of a motor vehicle, a metal supporting plate provided with integral legs adapted to fit between the flanges of the channel shaped side frame members of a motor vehicle, a flange on said plate extending under the upper flange of the channel member, and feet carried by said depending legs contacting with the lower flange of the channel member, whereby said supporting base is supported on the channel side frame members between the flanges thereof.

3. A unitary support base for a plurality of control mechanisms in a motor vehicle assembly, comprising a transversely arranged pressed sheet metal member, having front and rear depending flanges; depending legs adjacent the corners of said supporting base, feet on said depending legs, and lateral extensions on said base member, whereby said feet and said extensions may be located between the inturned flanges of the channel shaped side frame of a motor vehicle chassis, and means for securing said unitary support thereto.

4. A unitary support member for the controlling mechanisms of a motor vehicle chassis, comprising a transversely arranged sheet metal support base, having an arched body portion and flat extensions, depending integral members at the ends of said base, and a plurality of feet located on said depending portions to support said member between the side frame channel bars of a motor vehicle chassis, said arch-shaped member being adapted to support a plurality of controlling levers and controlling lever mechanisms, and to bridge a universal joint in a motor vehicle transmission assembly.

5. In a motor vehicle chassis having side frame members, a means of power transmission from the engine of the chassis to the rear wheels thereof, including a propeller shaft, a universal joint therein, a torque tube for supporting a part of said shaft, and a pivoted yoke for supporting said torque tube, the commbination therewith, of a transversely arranged unitary support and bracing member for carrying the operator's controlling lever and lever mechanism comprising a pressed metal base arched over the universal joint, said base being provided with means depending therefrom for pivotally supporting said torque tube yoke, and said base being arranged to carry the base of a gear shifting lever and external brake band controlling lever; said base member having a lateral front depending flange adapted to form means to carry and support a clutch controlling mechanism and pedal, and an internal brake controlling lever and pedal, and means for securing said member to said side frame members of the vehicle chassis.

6. In a motor vehicle chassis having a transmission including a propeller shaft, a transmission shaft, a universal joint, and a pivoted member for supporting one of said shafts, the combination therewith of a transverse brace for the frame of the vehicle chassis bridging said universal joint and provided with means to support said transmission shaft supporting means and pivot the same so as to permit movement thereof and controlling devices for the vehicle carried by said transverse brace.

7. In a motor vehicle chassis having a frame, a plurality of vehicle controlling lever mechanisms adapted to be controlled by the operator in manipulating the vehicle, the combination therewith of a unitary supporting member for said operating mechanisms, including a transverse body portion provided with depending front and rear lateral flanges, means at either end of said body portion for attaching the same rigidly to the side frame members of the vehicle chassis, means for supporting the base of the gear shifting lever and external brake band lever of the controlling mechanism on the upper surface of said body portion, and means for supporting the clutch controlling mechanism and the internal brake controlling mechanism for one of said depending lateral flanges on the body portion.

8. In a device of the class described, a motor vehicle chassis having a plurality of operator's control lever mechanisms, in combination therewith of a unitary supporting base for said plurality of controlling mechanisms, said base being formed of pressed metal shaped to form a substantially flat body portion and a plurality of depending stiffening flanges, means for supporting certain of said controlling levers to extend through the body portion of the member and means for supporting certain others of said controlling mechanisms from a depending flange thereof.

9. A unitary support for certain vehicle chassis assembly parts comprising a transversely arranged arched plate, means on said plate for supporting the same on the frame of the chassis, means whereby certain of said parts may be supported from the upper side of said plate, means whereby certain assembly parts may be supported from the under side of said plate and operating means for said parts extending through said plate.

10. In a motor vehicle chassis having side frame members, a transverse brace between said members and a plurality of vehicle controlling members pivoted above and extending through said brace.

11. In a motor vehicle chassis having side frame members, a transverse brace between said members and vehicle controlling mechanisms mounted on the top and bottom sides of said brace, certain of the operating parts of said mechanisms being extended through said brace.

12. In a motor vehicle chassis having side frame members, a transverse brace between said members and vehicle controlling mechanism mounted upon the top and front side of the brace, certain of the operating parts of said mechanism being extended through the top and side walls of said brace.

13. A unitary support for vehicle controlling mechanism comprising a transverse horizontally arranged member having vertical side flanges provided with downwardly extending legs adapted to be secured upon the side frame members of a motor vehicle, said support being located between said side frame members.

14. A unitary support for vehicle controlling mechanism comprising a channel shaped transverse member whose side flanges are provided with downwardly extending legs adapted to be secured to the side frame members of a motor vehicle and whose web portion has extended end portions adapted to be secured to said side frame members.

15. A unitary support for vehicle controlling mechanism comprising a central horizontal arched portion and end portion each having a pair of downwardly extending spaced legs adapted to rest upon and be secured to the side frame members of a motor vehicle said support being located between the said side frame members.

16. A unitary support for vehicle controlling mechanism comprising a central portion and end portions each having two laterally spaced downwardly extending legs adapted to be secured to the frame of a motor vehicle and each having an end securing part below the top of said central portion and above said legs.

17. A unitary support for vehicle controlling mechanism comprising an arched plate member, the opposite ends of which are adapted to be secured to the frame of a motor vehicle, said support having vertically disposed members at the sides of said plate members terminating in downwardly extending legs adapted to be secured to the frame of said vehicle.

18. A unitary support for vehicle controlling mechanism comprising a transverse horizontally positioned plate provided with depressed end portions adapted to be secured to the frame of a motor vehicle, vertically disposed side portions terminating in downwardly extending legs arranged to be connected to said vehicle frame.

In testimony whereof, we affix our signatures.

LYLE K. SNELL.
CHARLES W. McKINLEY.